United States Patent [19]

Schatz

[11] 3,814,254

[45] June 4, 1974

[54] AQUARIUM CLEANSING APPARATUS

[76] Inventor: Peter M. Schatz, 8440 Evergreen Ave., Indianapolis, Ind. 46240

[22] Filed: Oct. 18, 1972

[21] Appl. No.: 298,779

[52] U.S. Cl. .................. 210/169, 210/240, 210/295

[51] Int. Cl. .......................... E04h 3/20, B01d 23/10

[58] Field of Search ............ 210/169, 240, 241, 65, 210/232, 295; 119/5; 15/1.7

[56] References Cited

UNITED STATES PATENTS

| | | | |
|---|---|---|---|
| 1,101,541 | 6/1914 | Harrington | 15/1.7 |
| 2,769,779 | 11/1956 | Vansteenkste et al. | 210/169 X |
| 2,828,019 | 3/1958 | Lamberson | 210/169 |
| 2,956,507 | 10/1960 | Hutchinson | 210/169 |
| 3,225,930 | 12/1965 | Willinger | 15/1.7 X |
| 3,276,428 | 10/1966 | Burch | 119/5 |
| 3,693,798 | 9/1972 | White | 210/169 |

*Primary Examiner*—Theodore A. Granger
*Attorney, Agent, or Firm*—Trask, Jenkins and Hanley

[57] ABSTRACT

Apparatus for maintaining a clean environment in an aquarium. A false bottom having a perforate top and defining an open flow space thereunder is placed in an aquarium and is covered with a layer of gravel. An air-lift pump continuously pumps water out of the flow space and thereby circulates water downward through the gravel, and the gravel acts as a filter bed to collect wastes. A standpipe integral with the false bottom forms part of the air-lift pump and defines an open flow channel of large capacity from beneath the false bottom through the filter bed. Periodically, e.g., once a week, water is discharged from the tank through the standpipe, preferably with a piston pump, so as to produce a strong pulsating, flushing flow downward through the gravel bed, which cleans the gravel and removes accumulated waste from the tank, without disturbing the gravel or any decorative plants of the like which may be present. The air lift pump desirably includes a bottom-slotted conduit extending transversely beneath the false bottom, an air inlet pipe at one end thereof, and an upstanding aerator pipe within the standpipe. This provides a two-stage pumping action, first, within the aerator pipe and, second, within the standpipe, which produces strong continuous circulation, and good aeration of the water.

9 Claims, 10 Drawing Figures

41 45 44 50 42 30 10 40 35 36 107 32 16 12 28 26 24 26 28 12 16 46

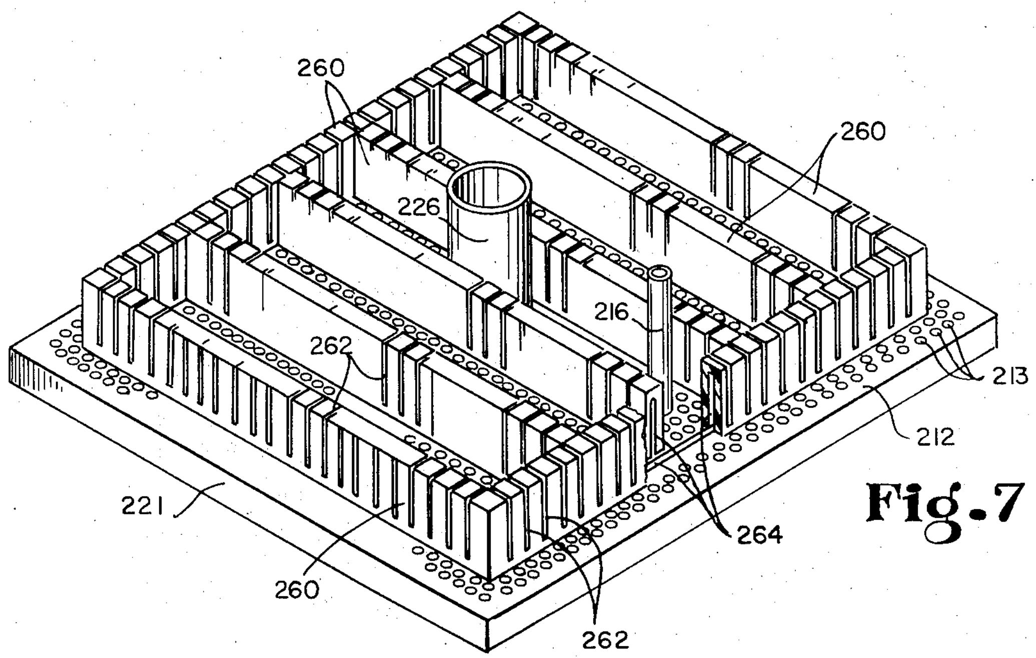
Fig. 7
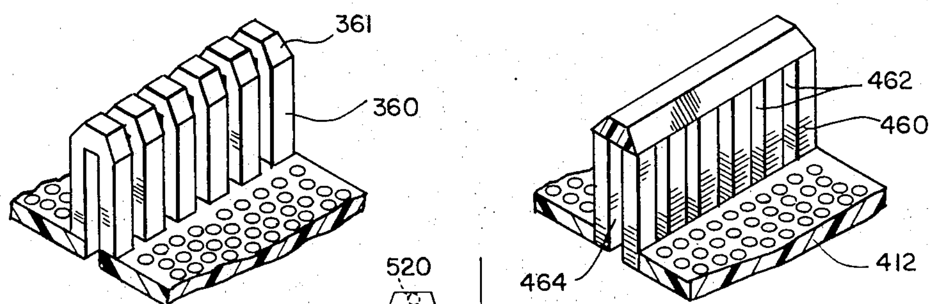
Fig. 8
Fig. 9
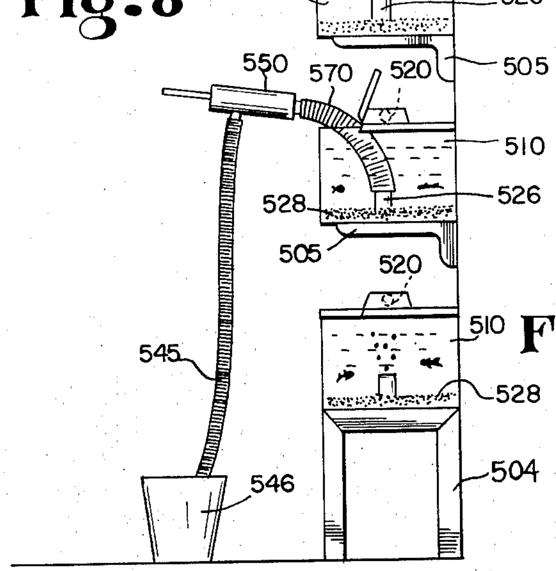
Fig. 10

AQUARIUM CLEANSING APPARATUS

BACKGROUND OF THE INVENTION

This invention relates to an aquarium of the domestic type, particularly to a method and apparatus for maintaining a clean environment therein and removing fish wastes and other contaminants, and for doing so in a manner which does not disturb either the fish or other contents of the aquarium.

A clean environment must be maintained in an aquarium in order to sustain healthy fish and aquatic life, and to preserve the clarity of the water and the attractive appearance of the aquarium and its contents, such as the gravel bed commonly used and the living or artificial plants and other decorations which may be present. Fish waste, excess food, and miscellaneous debris collects in the aquarium, and unless removed, makes the aquarium unhealthy for the fish and unattractive in appearance. Maintaining healthy and attractive aquatic life is especially inportant to one who displays and sells fish and aquarium equipment, for if his aquariums are unsightly and odorous, this detracts from his ability to sell his fish or equipment. It is of vital interest to a store owner to have an aquarium cleansing system which is inexpensive to purchase, does not disturb the fish or decorations in the aquarium, and requires a minimum of time and effort.

The prior art shows that a common method of maintaining a clean environment in an aquarium is to continuously filter part of the aquarium water through a filtering element, such as charcoal, glass wool, cotton, membrane or the like contained in a separate housing either submerged in or mounted externally of the aquarium. Such filtering systems are shown, for example, by Newsteder U.S. Pat. No. 3,487,440 and Willinger U.S. Pat. No. 3,321,081. These systems require that the filtering element be periodically replaced in order to maintain a desired level of cleanliness, which is time consuming and expensive. Moreover, such filters remove fine material which is suspended in the water fraction passing through the filter, but do not remove other materials which settle on and in the gravel bed and they provide no means by which to clean the gravel bed. In the prior art, such cleaning of the filter bed is done in a number of ways, all of which are unpleasant and time consuming. One way is to remove the fish and the water, wash the container and the gravel and other contents, and then replace the contents and the fish and the water. Another way is to stir the gravel to suspend the waste in the water and pass the resulting suspension through a power filter or other high-capacity filter. See, for example, Holt U.S. Pat. No. 3,302,789. These both involve a great deal of time and disturb the fish, the gravel, and the plants and other decorations in the aquarium.

For a store owner having a number of display aquariums, these methods require burdensome amounts of time and effort. Moreover, they both effectively remove the fish from sales display for lengthy periods of time. The second method while less time consuming, leaves the fish in a cloudy, dirty environment during the entire prolonged filtering period, which is neither good for the fish nor for their sale.

Aquarium cleaning systems have been proposed which use the gravel bed as a filtering element. These systems utilize a false bottom beneath the gravel bed and effect a slow downward circulation through the gravel bed and into the false bottom. See Sherman U.S. Pat. No. 3,515,097, and Sesholtz U.S. Pat. No. 3,516,544. These systems, like those mentioned above, do not provide any means by which to clean accumulated waste materials from the gravel bed. Again, the gravel bed must be periodically cleaned by either removing the aquarium contents and washing the gravel, or by agitating the gravel and pumping out the water. For reasons described above, neither approach is quick, simple, or satisfactory.

The present invention provides an improved aquarium cleansing system which will effectively remove fish wastes, excess food, and miscellaneous foreign waste matter from the water; which will do so without the use of filters requiring periodic replacement of filter elements; which will provide for periodic cleaning of the aquarium gravel bed without disturbing the contents of the aquarium; and which will maintain a clear and clean body of water in the aquarium at all times. Further, this invention provides an aquarium cleansing system which will accomplish these goals with equipment which is easy to construct, inexpensive to purchase, and fast and simple to operate.

SUMMARY OF THE INVENTION

In accordance with the present invention, an aquarium is provided with a perforate false bottom which supports a gravel bed above the bottom of the aquarium and defines an open flow space under the false bottom and the gravel bed. The false bottom may also carry studs or receptacles to support artificial plants. The gravel is of a size that will not pass through the perforate false bottom.

An open standpipe of large capacity is integral with and upstands from the false bottom to extend above the gravel bed, and defines a passage through the gravel bed from the open flow space beneath the false bottom.

Water is continuously circulated downward through the gravel bed to deposit waste materials therein, as by means of an air-lift pump acting through the standpipe.

Accumulated waste materials are periodically removed from the gravel bed by rapidly withdrawing water from the open flow space beneath the false bottom through the open standpipe and discharging it from the aquarium, thereby creating a rapid flow downward through the gravel bed to dislodge and flush away the waste materials.

Preferably, the water is withdrawn by a reciprocating pump, such as a piston pump, which produces a pulsating flow to enhance the flushing action. A manual pump for this purpose desirably includes a hollow pump rod defining a vent passage from the pump suction chamber. This passage can be held closed with the thumb while pumping, and can be opened when desired to break the suction, and thereby stop any siphon flow through the pump.

The flushing flow through the gravel bed is desirably a strong flow in order to dislodge the accumulated waste materials, and this requires adequate flow passages through the false bottom and the standpipe. Desirably, the false bottom surface area includes at least about 25 percent perforate area. For each 10 inch by 10 inch area of gravel bed, I desirably provide one standpipe with a flow passage area of at least about 0.75 square inch and preferably 1.00 square inch.

BRIEF DESCRIPTION OF THE DRAWINGS

The accompanying drawings illustrate the invention. In such drawings:

FIG. 7 is an isometric view of a modified embodiment of a modular false bottom, with parts cut away;

FIG. 8 is a partial isometric view showing a modification of the embodiment of FIG. 7;

FIG. 9 is another partial isometric view showing a modification of the embodiment of FIG. 7; and FIG. 10 is an end elevation of an aquarium display arrangement showing a modification in which the pump is connected by a flexible tubing.

DETAILED DESCRIPTION OF THE PREFERRED EMBODIMENT

Figure 1:
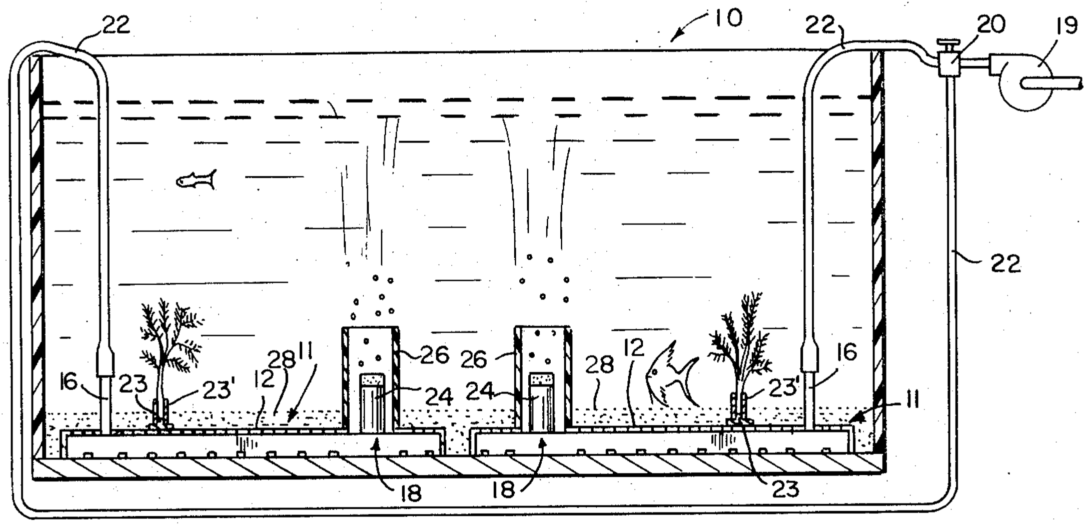
FIG. 1 is a longitudinal sectional view showing the general arrangement of a domestic aquarium containing two modular 10 inch × 10 inch false bottoms in accordance with my invention.

The aquarium 10 shown in FIG. 1 is a generally rectangular tank which contains two false bottom modules 11 resting on its bottom wall. The modules 11 each comprise a false bottom 12 spaced above the floor of the tank, which are covered with a gravel bed 28, and the aquarium 10 is filled with water. Each module 11 contains an air-lift pump 18 to which air is supplied through an air hose 22 from a gang valve 20 connected to an air pump 19 and provided with valves to allow for regulation of the air flow.

Figure 2:
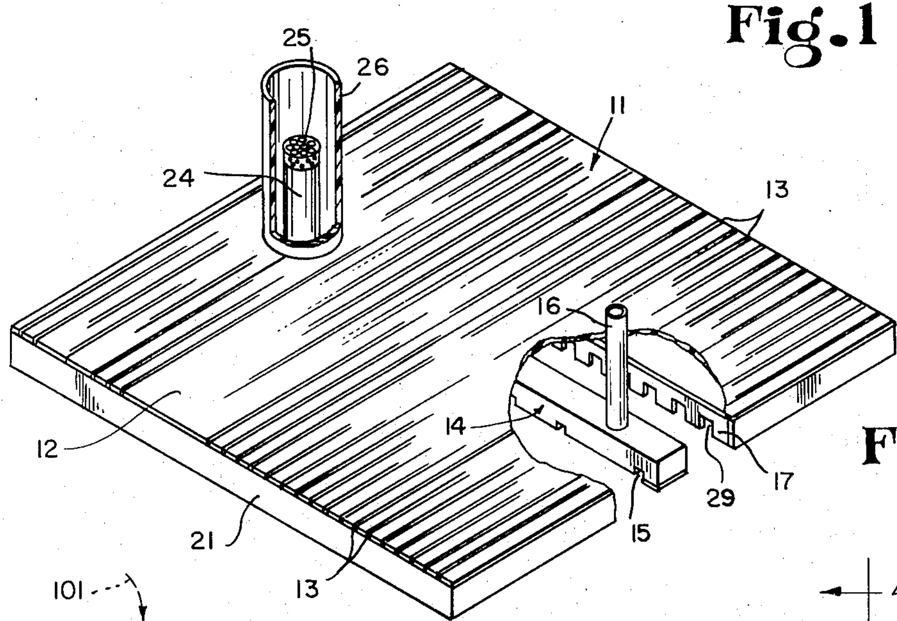
FIG. 2 is an isometric view of a representative false bottom, partially cut away.

The representative perforate false bottom module 11 shown in FIG. 2 has its false bottom 12 formed of a series of slats spaced from each other to define intervening slots 13 and supported approximately ½ inch above the bottom of the aquarium by a plurality of transverse ribs 17 and sidewalls 21. The transverse ribs 17 include a plurality of spaced notches 29 to provide open flow in the space beneath the false bottom 12. The height of the false bottom 12 above the floor of the aquarium should be sufficient to provide a substantially open space for water flow beneath the false bottom 12.

The transverse slots 13 desirably form about 25 percent of the total surface area of the false bottom 12, and are of a small size to prevent passage of the gravel. A plurality of holes may serve the same purpose if provided in sufficient size and number for adequate flow and to retain the gravel.

An open standpipe 26 upstands from the false bottom 12 and defines a passage from the open flow space beneath the false bottom 12, through the false bottom 12 and the gravel bed 28, and to an outlet above the gravel bed 28.

The false bottom desirably carries several spaced studs 23 to receive tubular receptacles 23' extending upward in the gravel bed for supporting artificial plants or other decorations in the aquarium independently of the gravel bed.

The false bottom module can be formed from any of several materials, and is desirably produced by molding from a plastic material, as by injection molding.

Figure 3:
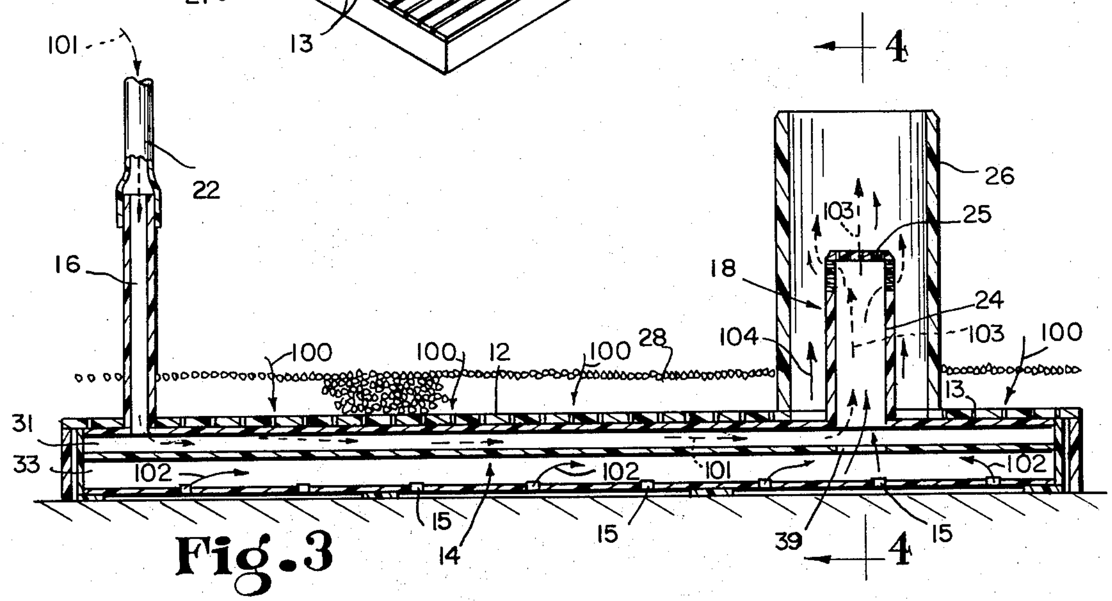
FIG. 3 is a sectional view showing the general flow of air and water through the system.

In the operation of the module, a continuous downward circulation of water through the gravel is desired in order to carry fish wastes, excess food, and other debris downward and into the gravel bed 28. The gravel bed 28 is sufficiently deep, preferably at least about 1 inch, to allow the bed to function as a filter. Such downward circulation of water is achieved by means of the air-lift pump 18. The air-lift pump 18 of the module 11 includes conduit means disposed in the open flow space beneath the false bottom 12, as shown in FIG. 3, and comprises an air inlet pipe 16, a horizontal manifold 14, and an aerator pipe 24. The horizontal manifold 14 defines an upper air conduit 31 from the air inlet pipe 16 to the bottom of the aerator pipe 24, and defines a lower water conduit 33 leading to a port 39 immediately below the aerator pipe 24, and having a series of spaced inlet openings 15 at its bottom side. The air inlet pipe 16 is connected, above the gravel bed, to the air hose 22 through which it is supplied with air under pressure from the pump 19. The air flows from the pipe 16 through the air conduit 31, as shown by the broken-line arrows 101 in FIG. 3, to the base of the aerator pipe 24, and thence upward through that aerator pipe. This causes water to be drawn through the port 39 from the conduit 33, which mixes with the air, and the resulting air-water mixture rises through the aerator pipe 24, as shown by the combined broken-line and solid-line arrows 103. Because water is drawn out of the water conduit 33 through the port 39, water is concurrently drawn from the open flow space beneath the false bottom 12 into the conduit 33 through its lower inlet openings 15, as shown by solid-line arrows 102. The air-lift pump 18 thus produces a pumping action from below the false bottom 12, into the water conduit 33, and up the aerator pipe 24 to the body of water above the gravel bed, which causes water to be continuously pulled downward over and through the gravel bed 28, as shown by arrows 100.

Figure 4:
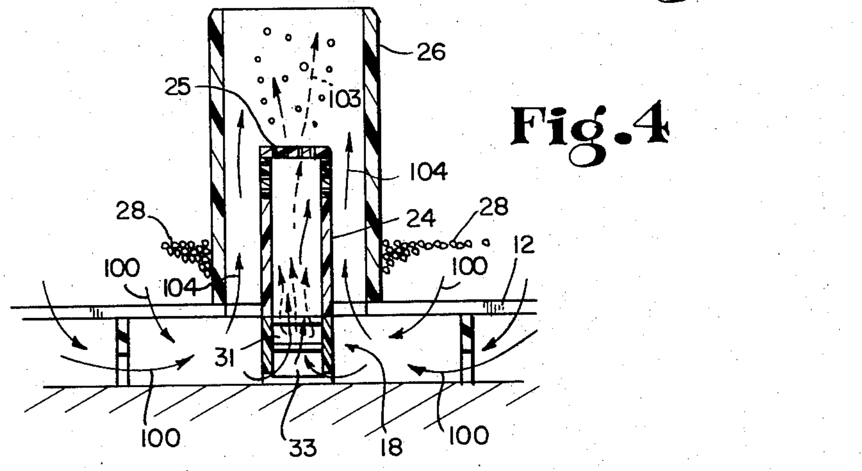
FIG. 4 is a sectional view taken on the line 4—4 of FIG. 3, and further showing the general flow of air and water through the system.

Desirably, the aerator pipe 24 of the air-lift pump 18 is disposed within the standpipe 26, as shown in FIGS. 3 and 4, so as to produce a second stage of air-lift pumping action. For this purpose, the upper end of the aerator pipe 24 is located intermediate the height of the standpipe 26 and discharges to that standpipe through a plurality of small perforations 25. These serve to break up the air into small bubbles which rise through the standpipe 26, as shown by the arrows 103, and upward therefrom through the body of water in the tank, as shown in FIG. 1. This causes a further or secondary stage of air-lift pumping action in the standpipe 26, by which water is drawn upward into the standpipe 26, outside the aerator pipe 24 as shown by arrows 104, from beneath the false bottom 12, and upward to the body of water above the gravel bed 28.

The two stages of air-lift pumping action produce a strong flow of water upward through the aerator pipe 24 and the standpipe 26 from below the gravel bed to above the gravel bed. This in turn causes a continuous general circulation of water downward through the gravel bed over the entire area thereof to deposit wastes on and in the gravel bed 28.

Periodically, for example, every 2 or 3 weeks, waste materials that have been drawn into the gravel bed 28 by the continuous downward water circulation are removed. It is an important feature of this invention to provide means for periodically removing the collected waste materials from the gravel bed 28 and from the aquarium, without disturbing the fish or the filter bed or other contents of the aquarium. Such removal of wastes is accomplished by withdrawing part of the water in the aquarium through the standpipe 26, so as to cause a flushing flow downward through the gravel bed 28 to the open flow space beneath the false bottom 12 and thence up the standpipe 26 and to a discharge conduit. This carries the accumulated wastes out of the gravel bed 28 to the discharge conduit without mixing the wastes with the main body of water in the aquarium, and leaves that main body clean and clear. Effective cleaning can be accomplished by withdrawing say from one-fourth to one-third of the water in the tank. The water removed is of course replaced by clean water.

Figure 5:
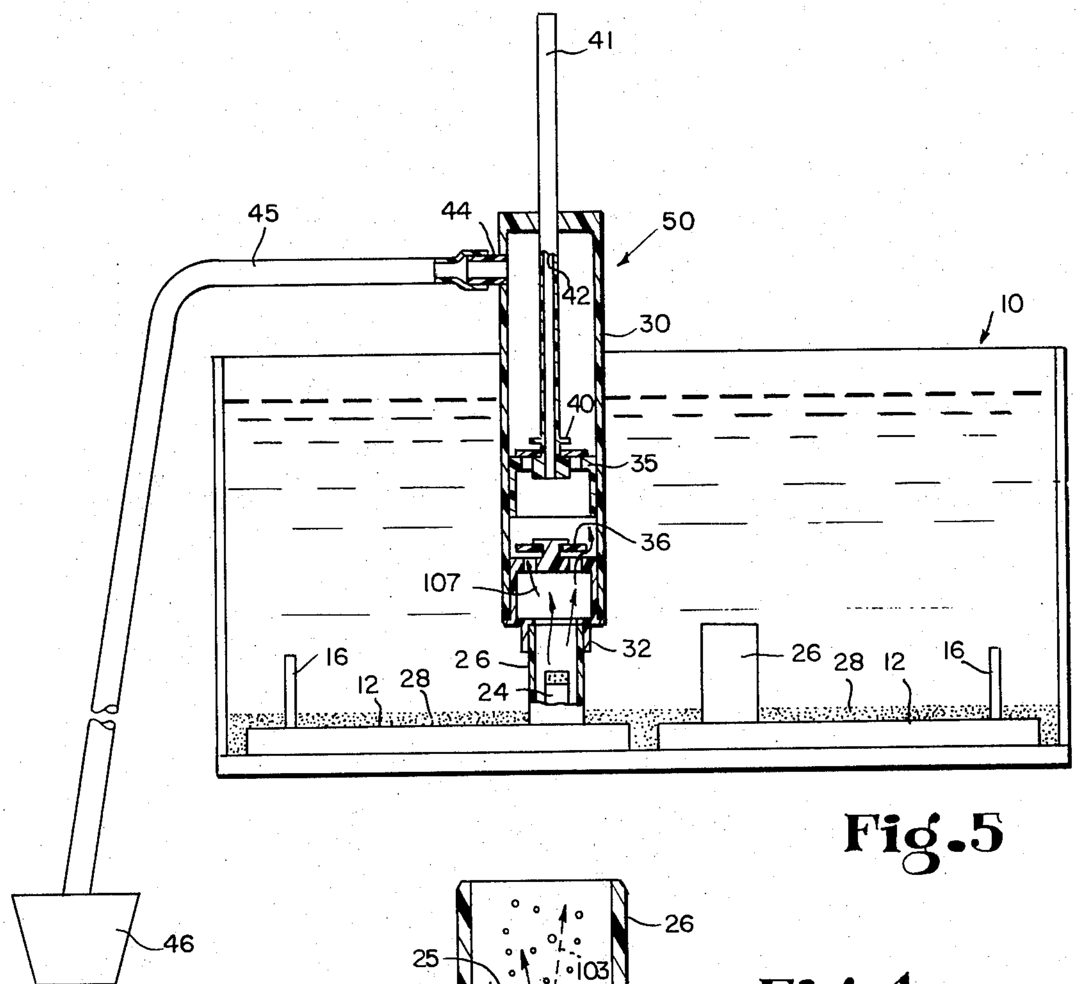
FIG. 5 is a sectional view of the aquarium of FIG. 1 with a suction piston pump connected with the standpipe for periodically flushing the gravel bed.

The water withdrawal is preferably effected by a reciprocating pump, which produces a pulsing flow through the gravel bed. A suction piston pump 50 is shown in FIG. 5 for the purpose of removing collected waste materials from the gravel bed 28 and from the aquarium. The suction piston pump 50 shown comprises a cylinder 30 containing a piston 35 and having an end fitting 32 adapted to fit closely over the top of the standpipe 26. A piston rod 41 is attached to the piston 35 and is preferably hollow to form a vent passage 42 from the suction chamber of the pump 50. A lower check valve 36 is provided on the end fitting 32, and an upper check valve 40 is provided on the piston 35. Near the top of the cylinder 30, as shown in FIG. 5, is a hose connector 44, to which is connected a water line 45 terminating in a bucket 46 or the like. Desirably, the water line 45 may extend to a level below the aquarium, so that the pump and the water line together form a siphon.

In using the suction piston pump 50, the operator grasps the hollow piston rod 41 and closes the passage 42 with his thumb. He then pulls up on the piston rod 41 to lift the piston and draw water upward from the standpipe 26 into the pump cylinder 30 past the lower check valve 36. By repeated up and down strokes of the piston rod 41, water is pumped upward through the standpipe 26, through the suction piston pump 50, and through the hose connector 44 and water line 45 to the bucket 46.

Desirably, the suction piston pump 50 is operated at least initially in a series of sharp and rapid strokes. This produces a strong, pulsating water flow upward through the standpipe 26 and hence downward through the gravel bed 28 and the false bottom 12. The strong, pulsating water flow downward through the gravel bed 28 acts to dislodge accumulated wastes therefrom and to flush them through the standpipe 26 and the pump 50, and to discharge them into the bucket 46.

A strong siphon flow through the piston pump 50 shown in FIG. 5 is induced by positioning the bucket 46 containing the discharge end of the water line 45 horizontally below the tank 10, as shown. With this arrangement, two or three sharp strokes of the pump 50 will dislodge the wastes from the gravel bed and initiate siphon flow through the pump 50 and the water line 45. Such a siphon flow may be sufficient to complete the desired flushing of accumulated waste materials from the gravel bed 28, without further pumping. When sufficient flushing flow has occurred, the operator breaks the siphon flow by removing his thumb from the passage 42 of the hollow piston rod 41.

The pump flow and the siphon flow described above remove wastes from the gravel and discharge the waste materials outside the aquarium without mixing them with the main body of water in the aquarium, so that the main body remains clear.

Adequate flow passage areas should be provided through the false bottom 12 and the standpipe 26 in order to permit the desired strong flushing flow through the gravel bed 28. Desirably, the false bottom surface area includes at least about 25 percent open area. A 10 inch by 10 inch false bottom is desirably provided with an open standpipe defining an effective pump suction area of at least about 0.75 square inch and preferably 1.00 square inch. The effective pump suction area can be defined as the open area of the standpipe, that is, the cross-sectional area of the standpipe less the area occupied by the aerator pipe disposed therein. For example, a 10 inch by 10 inch false bottom having a 1.25 square inch standpipe with a 0.25 square inch aerator pipe disposed therein has an effective pump suction area of 1.00 square inch, which is 1 percent of the false bottom surface area. If the aerator pipe were omitted, as when water circulation is provided by some other means, then the effective pump suction area would be the full open area of the standpipe.

The suction piston pump may be constructed from any of several materials, desirably, of a lightweight, inexpensive plastic. Preferably, the walls are transparent to allow the operator to see the material flowing through the pump. When the water inside the pump becomes clear, the operator knows that the gravel bed has been flushed.

Figure 6:
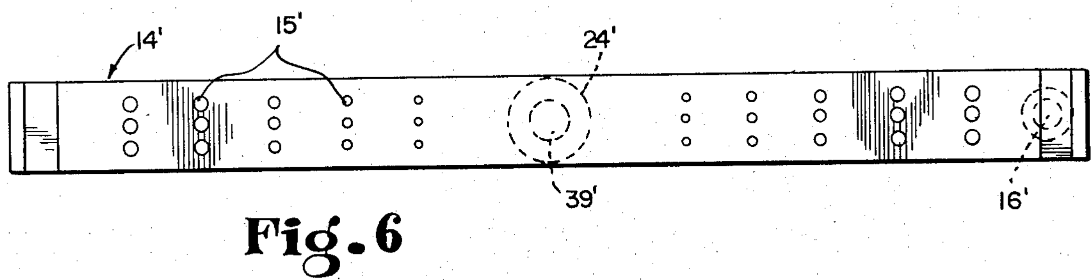
FIG. 6 is a bottom view of the air-lift pump manifold showing bottom openings of graduated, rather than uniform, size.

FIG. 6 shows a modified form of aerator manifold. The manifold 14', shown in a bottom view, has its aerator pipe 24' centered between its ends, for use with a false bottom module as in FIG. 7 in which the standpipe is in the center. Its air inlet pipe 16' is at one end. Like the manifold of FIG. 3, it has an upper air conduit leading from the air inlet pipe 16' to the aerator pipe 24'. It also has a lower water conduit having an outlet port 39' leading to the aerator pipe 24', and has suction inlet openings 15' in its bottom wall. In this modification, the suction openings 15' are in the form of perforations of graduated size, with the largest at the greatest distance from the outlet port 39'. This provides a distribution of inlet flow different from that of the manifold of FIG. 3.

A modified false bottom module is shown in FIG. 7. This modification comprises a false bottom or platform 212 joined to supporting sidewalls 221 and supported at intermediate points by ribs or posts or other supports. The platform 212 has a central standpipe 226 containing an aerator pipe (now shown) connected to an air inlet pipe 216 by a manifold such as that shown in FIG. 6. The platform 212 carries a pattern of upstanding ribs 260 defined by side and top walls which form downward open channels 264 communicating with the open flow space beneath the false bottom 212. To provide for downward flow to the flow space, the false bottom or platform 212 contains a plurality of perforations 213, and the ribs 260 are formed with spaced slots 262. In use, the ribs 260 project upward into the gravel bed. The slots 262 and the perforations 213 provide a passage area for flow from the gravel bed to the underlying flow space, which can be substantially larger for the same gravel bed area than that of the modification of FIGS. 1–3, and which can provide a different flow pattern.

Modifications of the upstanding ribs of FIG. 7 are shown in FIGS. 8 and 9. In FIG. 8, the slotted ribs 360 are similar to the ribs 260 of FIG. 7, but are cut away at their top edges to form sloping side faces 361. In FIG. 9, the tops of the ribs 460 are closed, and the slots 462 extend downward through the platform 412, which permits the channels 464 and the slots 462 to be molded with a common core projecting up from the bottom. As in FIG. 7, the slots of FIGS. 8 and 9 can be sized and spaced to vary the perforate area and the flow pattern which will be produced.

In operation, during normal use, air is supplied through the air hose 22 to the air inlet pipe 16 of each horizontal manifold 14. The air passes through the upper conduit 31 of the manifold 14 (FIG. 3) and rises in the aerator pipe 24, where it mixes with water entering the aerator pipe from the port 39 between the upper air conduit 31 and the lower water conduit 33. This produces an air-lift pumping action in the aerator pipe 24 which acts to draw water from the open flow space beneath the false bottom 12, through the slots 15 in the bottom wall of the manifold 14, into the water conduit 33, and thence upward through the aerator pipe 24. The perforated upper end of the aerator pipe 24 breaks up the air therein into small bubbles and discharges them to the water in the standpipe 26. A secondary air-lift pumping action is thereby created in the standpipe 26 which acts to draw water upward through the standpipe from the open flow space below the false bottom 12 (FIG. 4). The upward motion of water through the aerator pipe 24 and the standpipe 26 causes a general downward circulation of water through the entire area of the gravel bed 28, which causes waste materials to be deposited on and in the gravel bed.

Periodically, accumulated waste materials are removed from the gravel bed 28 by attaching a piston pump 50 to the standpipe 26 and operating that pump to produce a strong, pulsating flow through the standpipe from the flow space beneath the false bottom. This causes a general flushing flow downward through the gravel bed and into the open flow space, which dislodges accumulated wastes from the gravel and carries them into the flow space, through the standpipe, and through the pump to the discharge line 45. Once discharge flow has been initiated in this way, it may be allowed to continue by siphon action through the pump 50 and line 45, and the siphon action can be stopped at any time by venting the pump at the hollow piston rod.

With discharge flow through this path of not more than one-third the water in the aquarium tank, the gravel bed is thoroughly cleaned. The water removed is replaced with clean water. Periodic cleaning in this way maintains the aquarium in clean and healthy condition.

FIG. 10 shows a common way of displaying fish and aquarium tanks for sale. A series of tanks 510 are mounted in a vertical stack, as on a stand 504 and shelves 505, to allow for easy viewing, and a space is provided above each tank 510 for a light 520 and to permit access to each tank. This space between the tanks is too small for a suction pump to be connected directly to the standpipes 526 in the tanks and operated in an upright position for periodic cleaning as shown in FIG. 5. A flexible tubing 570 is therefore desirably provided to connect the pump 550 to the standpipe 526 and to allow the pump to be located outside the tank, as in a horizontal position as shown. The tubing 570 interconnects the standpipe 526 with the pump 550 and is of sufficient flexibility and length to bend through an angle of about 90° and to extend from the standpipe 526 out of the tank 510. With the tubing attached, the pump can be operated substantially horizontally and the wastes are discharged through the tubing 570, the pump 550, and the discharge line 545 to a bucket 546.

I claim:

1. Apparatus for maintaining a clean environment in an aquarium comprising:

a perforate false bottom for supporting a gravel bed above the bottom of the aquarium over a predetermined area thereof and for defining a flow space under the false bottom and gravel bed over such area;

a standpipe upstanding from said false bottom defining a passage from said flow space and having an outlet above the gravel bed;

means for continuously circulating water downward through the gravel bed and into the flow space to deposit waste material in the gravel bed over said predetermined area; and means for periodically withdrawing water rapidly through the standpipe from said open flow space and discharging the same from the aquarium, said means including a water withdrawal device, connection means to establish a suction connection between said device and the outlet of said standpipe which connection is substantially closed against direct entry of water from the body of water in the aquarium, and a discharge conduit to convey withdrawn water to a discharge point outside the aquarium, said flow space being substantially closed except for entrance of water through the perforate false bottom over said predetermined area and withdrawal of water through said standpipe and water withdrawal device, said water withdrawal device being constructed and arranged to withdraw water through the standpipe in such quantities as to cause rapid flushing flow downward through the gravel bed over said entire predetermined area to remove deposited waste material therefrom and to discharge the waste material from the aquarium through said discharge conduit, whereby waste material is removed from said gravel bed substantially without roiling or clouding the body of water in the aquarium.

2. Apparatus as in claim 1 in which said means for circulating water downward through the gravel bed comprises air lift pump means operative to pump water upward through said standpipe from said flow space, and thereby induce said downward circulation through the gravel bed.

3. Apparatus as in claim 2 in which said air-lift pump means comprises an aerator tube disposed in said standpipe, air conduit means to supply air to the bottom of said tube, and a port to supply water to said tube from said flow space so as to mix water and air in said tube to induce air lift pumping action therethrough, said aerator tube discharging to the standpipe intermediate the height thereof, so as to discharge air to the standpipe to induce a second stage of air lift pumping action in said standpipe.

4. Apparatus as in claim 2 further comprising an air supply pipe spaced from said standpipe, a manifold extending transversely beneath the false bottom from the air supply pipe to the standpipe, an aerator tube mounted on said manifold and positioned within the standpipe, an air conduit in the manifold connecting the air supply pipe to the aerator tube to discharge air upward therethrough, and a water inlet port for supplying water from the flow space to the aerator tube for admixture with the air therein so as to cause air lift pumping of said water in said aerator tube.

5. Apparatus as in claim 1 in which said perforate false bottom comprises horizontal wall portions and a series of spaced hollow ribs upstanding from said wall portions and defining downward open channels communicating with said flow space, said ribs having openings through the sidewalls thereof to permit passage of water from an overlying gravel bed through the false bottom to the underlying flow space.

6. Apparatus as in claim 5 in which said upstanding ribs have top walls bridging the openings in the sidewalls thereof.

7. Apparatus as in claim 1 in which said water withdrawal device is a reciprocating pump having an inlet connection for connection to the standpipe and an outlet for discharging liquid outside the aquarium.

8. Apparatus as in claim 7 in which said reciprocating pump is a piston pump.

9. Apparatus as in claim 7 in which said pump has a hollow actuating rod by which the displacement element of the pump is reciprocated by manual operation, the hollow rod having a passage therein communicating with the pump displacement chamber and having an opening positioned to be manually closed by the hand of the operator during operation and to be opened when operation is stopped to vent the displacement chamber and thereby break any siphon action through the pump.

* * * * *